Nov. 8, 1932.  T. W. JOHNSON  1,886,691
CULTIVATOR
Original Filed Oct. 2, 1930  4 Sheets-Sheet 2

WITNESS
Walter Ackerman

INVENTOR
Theodore W. Johnson,
by Brown, Jackson, Boettcher & Dienner
ATTORNEYS

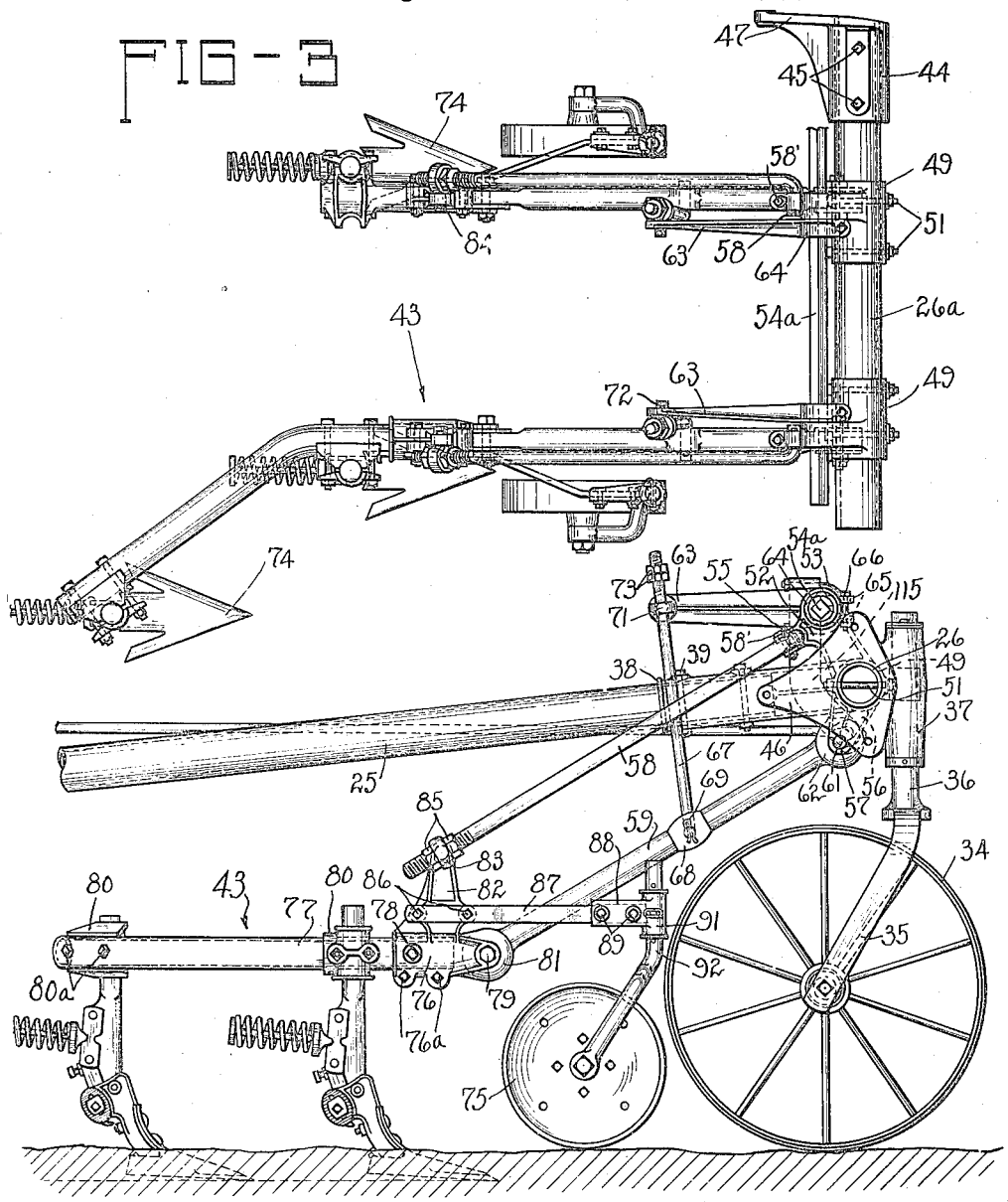

Nov. 8, 1932.  T. W. JOHNSON  1,886,691
CULTIVATOR
Original Filed Oct. 2, 1930  4 Sheets-Sheet 4
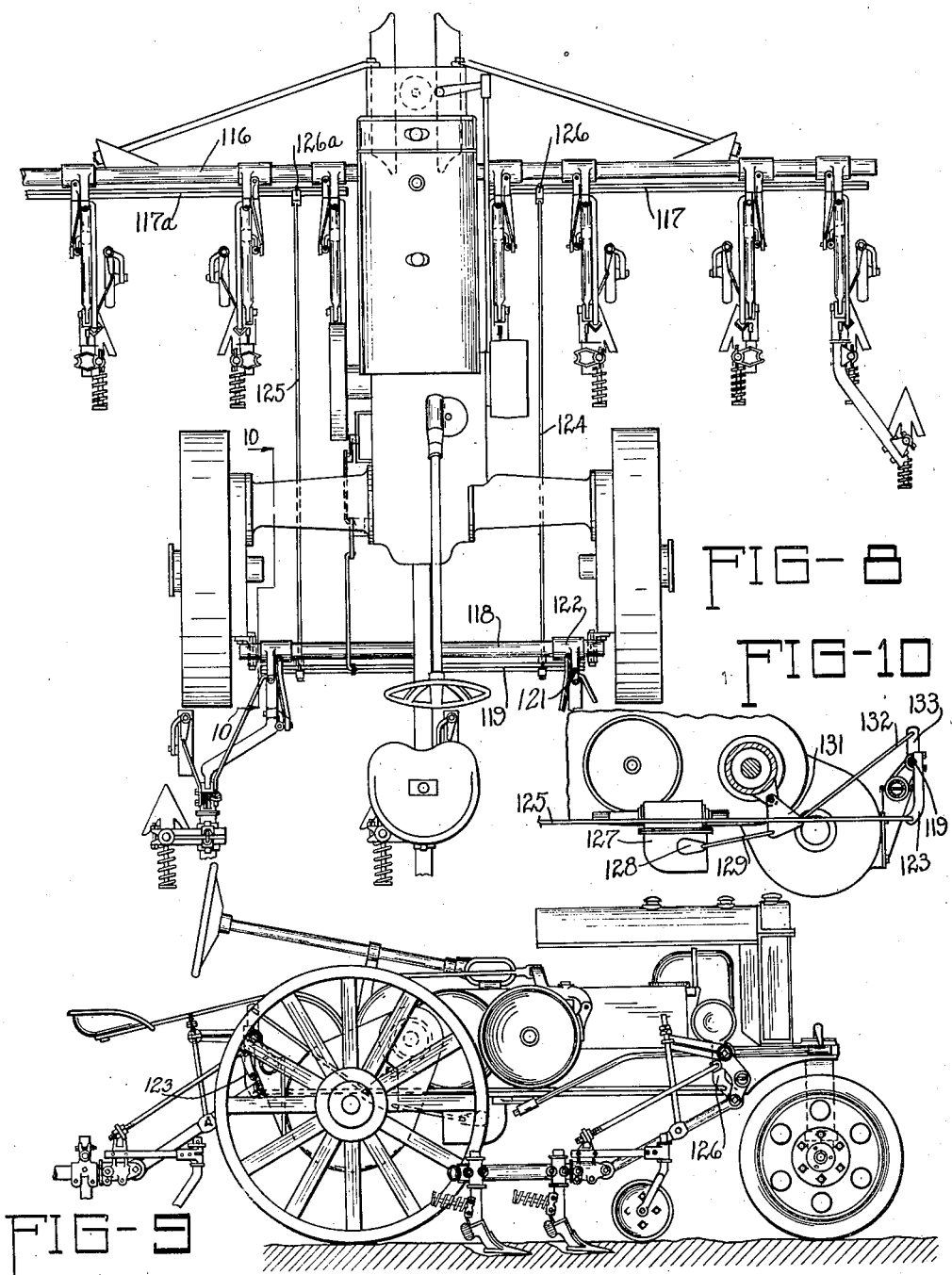
INVENTOR
Theodore W. Johnson,
by Brown, Jackson, Boettcher & Dienner.
ATTYS.

Patented Nov. 8, 1932

1,886,691

UNITED STATES PATENT OFFICE

THEODORE W. JOHNSON, OF MOLINE, ILLINOIS, ASSIGNOR TO DEERE & COMPANY, OF MOLINE, ILLINOIS, A CORPORATION OF ILLINOIS

CULTIVATOR

Application filed October 2, 1930, Serial No. 485,844. Renewed April 2, 1932.

This invention relates generally to cultivating implements of the type comprising an attachment or attachments adapted to be directly connected with either the front or rear ends, or both ends, of a tractor, so that the attachment or attachments and the tractor function together as a unitary, power operated cultivating implement, and in which the cultivating rigs of such attachment or attachments are separately pivotally connected with the attachment frames so as to be capable of rising and falling independently of each other in passing over uneven ground, the pivotal connecting means being effective to maintain the shovel or shovels of the rigs in a definite angular relation to the ground in the vertical movement of the rigs relatively to the implement frame. As will hereinafter appear, however, certain features of the invention also have application to other types of cultivating implements.

The principal object of the invention is to provide each of the cultivator rigs of such attachments with a gauge wheel in the form of a caster wheel so that when the cultivator is shifted laterally or turned at the end of the field the gauge wheels will offer no resistance to such lateral shifting or turning of the implement, but will merely turn and follow in the manner characteristic of caster wheels.

Another object of the invention is to provide means for vertically adjusting the caster gauge wheels so that the depth at which the shovels of the rigs run can be adjusted. A further object of the invention is to provide adjustable means for pivotally connecting each of the rigs with its supporting frame so that the level of said rigs may be adjusted.

A still further object of the invention is to connect the rear implement frame or attachment to the tractor whereby the pivotal connections between the rear rigs and said frame are positioned within the tread and the diameter of the rear wheels of the tractor, thus bringing the cultivating shovels up close to said rear wheels.

A still further object of the invention is to pivotally connect the front cultivator attachment to the tractor below the axis of the rear supporting wheels so that the load will tend to hold the front end of the tractor down rather than tip it up, as would be the case if the attachment was connected to the tractor frame above the axis of the rear supporting wheels.

A still further object of the invention is to provide an improved and simplified construction of power lift mechanism deriving power from the engine of the tractor for raising all of the cultivator rigs to transport position. One of the features of this power lift mechanism is the provision of a rock shaft at the rear of the tractor operated from the power lift and a link or links connecting the rear rock shaft with a rock shaft or rock shafts on the forward implement frame whereby said front rock shafts are rocked by the rocking of said rear rock shaft through the connecting links acting under tension.

Other objects and advantageous features will be apparent from the following description of my invention taken in connection with the accompanying drawings, in which—

Fig. 3 is an enlarged plan view of the outer transverse frame bar of the front cultivating implement which carries the two outer cultivating rigs and illustrating the means for connecting such outer frame bar to the central frame bar of the front implement;

Fig. 4 is an enlarged side elevation of the front implement frame shown in Fig. 3 and illustrating the adjustable parallel link mounting provided for each of the cultivating rigs;

Fig. 5 is an enlarged fragmentary detail view showing the vertically adjustable caster wheel spindle and its supporting sleeve, and the means for adjusting the spindle vertically in said sleeve;

Fig. 6 is a sectional view taken on the line 6—6 of Fig. 5;

Fig. 8 is a plan view illustrating a modified form of front tillage implement and the means for raising the cultivator rigs thereof from the power lift mechanism. In this construction the front tillage implement is supported in an opening in the lower side of the tractor housing adjacent the forward end portion thereof;

Fig. 9 is a side elevation of the implement shown in Fig. 8; and

Fig. 10 is a fragmentary view taken on the line 10—10 of Fig. 8.

Figure 1:
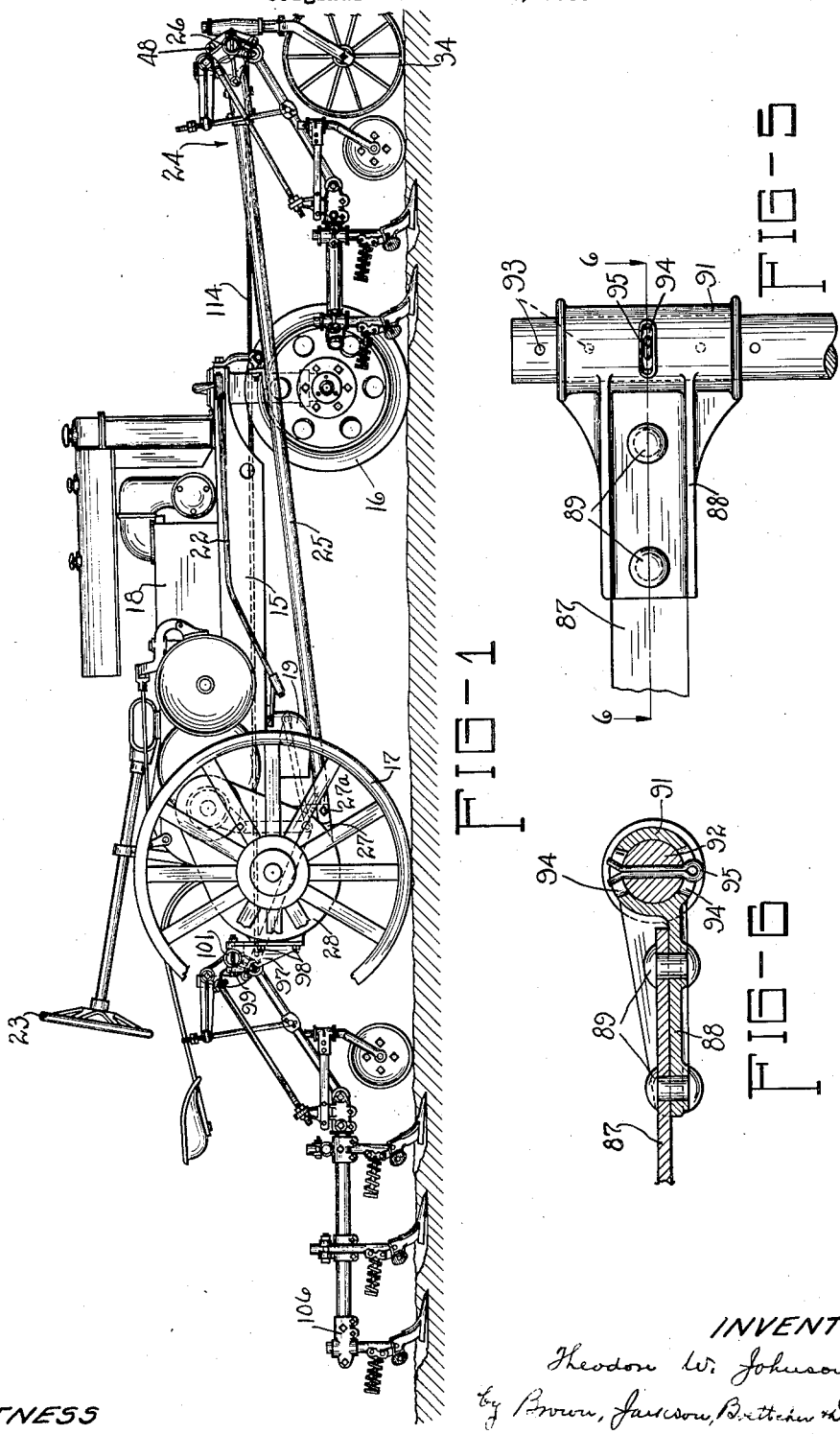
Fig. 1 is a side elevation showing the tractor with both front and rear cultivating implements attached in assembled relation.

Referring to Figs. 1 to 7, the tractor comprises a suitable main frame structure 15 which is supported at its front end on two steering wheels 16 and at its rear end on two traction wheels 17. In the construction shown the two steering wheels 16 are disposed close together, comparable to a three-wheel tractor, but it is to be understood that the invention is also applicable to a four-wheel tractor wherein the two steering wheels are spaced relatively far apart. The tractor motor is represented by the horizontal cylinder engine indicated at 18, from which power is transmitted through any conventional arrangement of clutch, selective speed transmission, differential mechanism and driving means to the rear traction wheels 17. In order to utilize the power of the engine for lifting the cultivator rigs to transport position the tractor is provided with a suitable power take-off device operatively connected with the engine and arranged to actuate a power lift clutch under the control of the operator.

Such power lift mechanism is indicated generally by the numeral 19, and it is deemed unnecessary to describe the same specifically because the details thereof constitute no part of the present invention. It will suffice to say here that the power shaft extends laterally from such mechanism and supports a crank 21 adjacent to the side of the tractor frame from which lifting movement is transmitted to the cultivator rigs through linkage which will be presently described.

The front tractor wheels 16 are steered by means of suitable steering mechanism represented in part by a drag link 22 which is operatively connected at its front end with said steering wheels and at its rear end with a steering control wheel 23 located adjacent to the operator's seat at the rear end of the tractor.

Figures 2, 7:
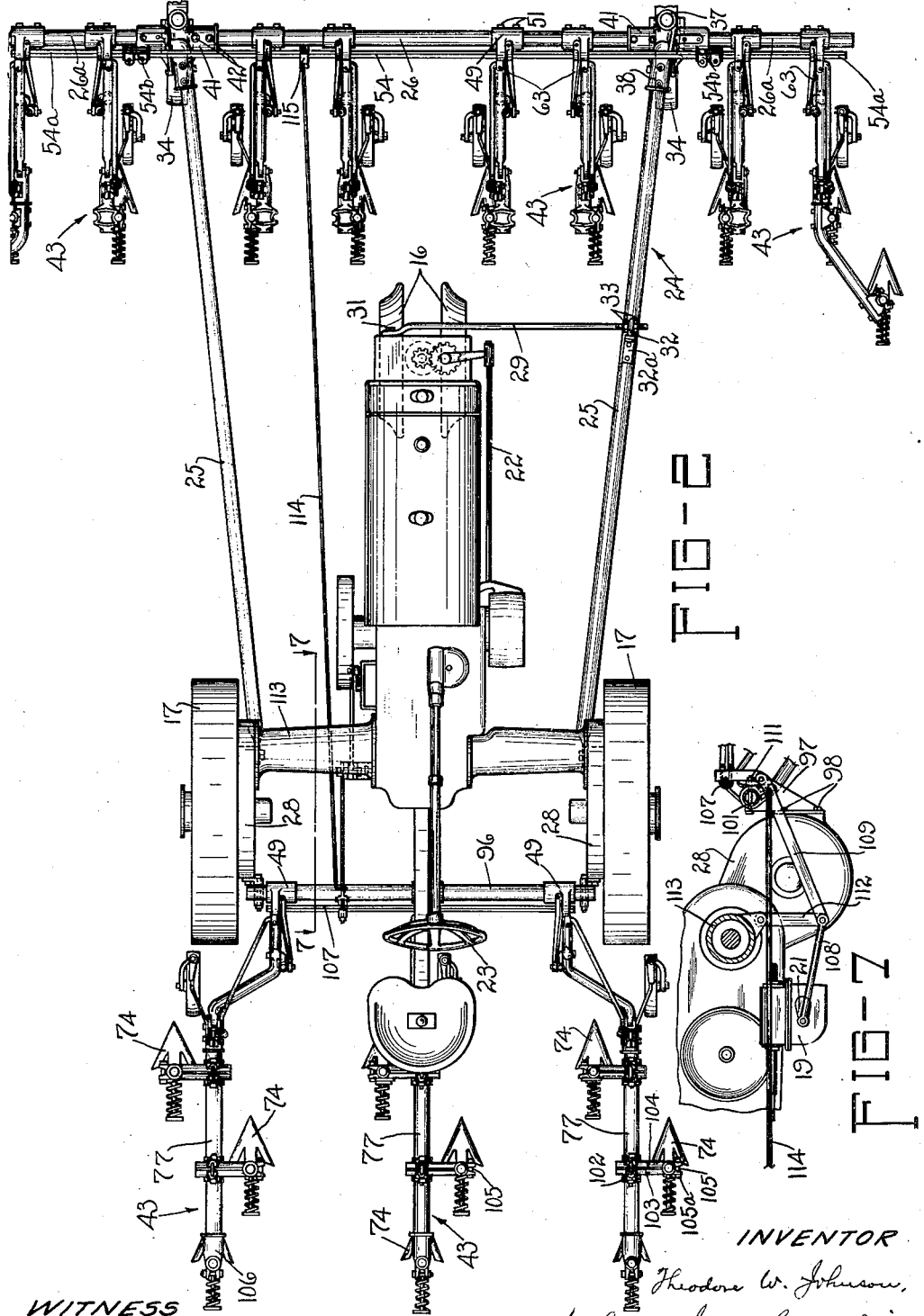
Fig. 2 is a plan view of the same.
Fig. 7 is a fragmentary sectional view taken on the line 7—7 of Fig. 2, and illustrating the linkage connection between the power lift mechanism and the rear rock shaft.

The front implement frame is indicated in its entirety by the reference numeral 24, and comprises the two forwardly extending frame bars 25 and the transverse front frame bar 26. As shown in Fig. 2, the longitudinally extending frame bars 25 diverge inwardly slightly toward their rear ends, and as shown in Fig. 1 such ends are pivotally connected to brackets 27 by pivot bolts 27a, said brackets extending forwardly from the lower portions of housings 28 that enclose the driving chains for the two traction wheels 17 at opposite sides of the tractor. By thus pivotally connecting the frame bars 25 with the lower portions of the housings 28 the implement frame has relative vertical movement with respect to the tractor when passing over uneven ground. By this construction the bars 25 are brought more nearly into parallel relation with each other than would be the case if they were connected with the frame 15 of the tractor, thereby lessening the tendency of said bars to buckle and also applying the load to the tractor at a point below the axis of the rear traction wheels instead of above the axis thereof. As a result, the load tends to hold the front end of the tractor down rather than to lift it up, as would be the case if the bars were connected to the tractor above the axis of the rear traction wheels. When it is desired to detach the front implement frame from the tractor it is only necessary to remove the pivot bolts 27a connecting the bars 25 with the brackets 27.

To aid in compelling the implement frame to swing directly with the front end of the tractor in the steering movement of the latter, a transverse guide link 29 is connected between the front end of the tractor and one of the frame bars 25. The inner end of such link is pivotally connected by a bolt 31 with the front portion of the tractor, and the outer end thereof is threaded through an eye bolt 32 secured to a bracket 32a rigidly connected to one of the frame bars 25. The outer end of said link is provided with screw threads and is adjustably held in position in said eye bolt by means of a pair of nuts 33 threaded on said link on opposite sides of said bolt. By means of this link lateral steering effort is transmitted from the front end of the tractor directly to the implement frame, thus relieving the pivotal connections of the bars 25 with the chain housings of the duty of guiding and steering the implement frame.

The forward portion of the front implement frame is supported on two or more caster wheels 34 located at spaced points below the transverse frame bar 26, and are so positioned that they will track between the plant rows. Each wheel is pivotally mounted between the spaced arms of a yoke 35 extending rearwardly, the upper portion of which is formed with a vertical spindle 36 having bearing support in a bearing sleeve or boss 37 supported by the transverse frame bar 26 as hereinafter described.

The frame bars 25 are preferably tubular in cross-section and their forwardly extending ends project into sleeve-like socket members 38 in which they are secured by transverse bolts 39, see Fig. 4. The transverse frame bar 26 is also of tubular section, and each socket 38 has formed integral therewith a laterally extending sleeve-like socket member 41 (Fig. 2) for receiving an end of the transverse frame bar 26, said bar being held in position against endwise and rotative movement in said socket members 41 by means of bolts 42. The bearing sleeves 37 for the spindles 36 of the caster wheels are also formed integral with these two socket members on the forward sides thereof. It will be seen that the foregoing construction provides an approximately rectangular frame structure composed of three tubular bars joined at the forward corners by elbow couplings, such frame being wheel supported at its front end and pivotally connected with the tractor at its rear end.

Supported on the front frame bar 26 at spaced points across the width of the implement frame are the cultivator rigs 43. In the present construction I have shown a four-row implement comprising eight rigs, one on each side of each plant row, and for such construction the tractor is designed with each of its rear traction wheels 17 spaced considerably from the body of the tractor, thereby permitting the two intermediate plant rows to pass between the traction wheels and the body of the tractor at each side thereof.

Owing to the difficulty of getting an implement of such wide span through gates and other narrow spaces in the transportation of the implement, I have provided a sectionalized frame which permits the two outermost pairs of rigs to be readily removed for reducing the width of the implement. To this end the front frame bar 26 is provided with two separate outer sections 26a extending outwardly beyond each coupling member 38, 41 for supporting the outer rigs. One of these outer sections is illustrated in Fig. 3, and as there shown the inner end of the extension bar 26a extends into a sleeve-like coupling member 44 in which it is rigidly secured by transverse bolts 45. The integral coupling comprising the sockets 38 and 41 and the coupling member 44 are provided with radially extending coupling flanges 46 and 47 which are rigidly connected together by transverse bolts 48, best shown in Fig. 1. To reduce the span of the implement it is only necessary to remove the bolts 48, whereupon the end sections 26a of the transverse frame bar 26 may be removed from the central section 26, as will be readily understood.

As best shown in Figs. 2 and 3, each cultivating rig is operatively connected with the front frame bar 26, 26a by means of a sleeve 49 engaging over the bar and secured thereto by two screws or bolts 51 extending transversely through the sleeve and bar. The bar is provided with a plurality of spaced holes for receiving the bolts 51 at different points therealong so that each sleeve 49 may be shifted in either direction along said bar for accommodating different row spacings between the pairs of rigs.

As best shown in Fig. 4, an arm 52 projects upwardly and rearwardly from each sleeve 49 and has a bearing boss 53 formed at its outer end. A transversely extending rock shaft 54 is rotatably mounted in these several bearing bosses, as will be presently described. As shown in Fig. 2, said rock shaft is also made in sections to accommodate removal of the end sections 26a, 26a of the front frame bar, the outer sections 54a of the rock shaft being coupled to the intermediate section thereof by means of coupling sleeves 54b. Each arm 52 is also provided on the rear side thereof adjacent the bearing boss 53 with a bifurcated bearing portion 55. Another arm 56 extends downwardly from each sleeve and has a bifurcated bearing portion 57 formed in its lower end. These two bearing portions 55 and 57 of each sleeve pivotally support the upper ends of two substantially parallel links 58 and 59 which support the lower portion of the cultivator rig which will be hereinafter described. The upper link 58 has its upper end bent laterally to pass through the bifurcated bearing portion 55, the bent end receiving a cotter pin or any other suitable retaining device on the opposite side of the bearing boss, and the two bifurcated ends of the bearing are connected together by means of a bolt 58'. The lower link 59 is pivotally mounted between the bifurcated ends of the bearing portion 57 by a pivot bolt 61, and this end of the link is formed with a flattened portion 62 of considerable area contacting with the flat surfaces of the bifurcated portion 57 whereby side play of the link 59 is substantially eliminated and the rig is accurately held in the desired line of travel.

The rock shaft 54 is square or polygonal in cross-section, and mounted thereon in the plane of each rig mounting sleeve 49 is a rig lifting arm 63. Each lifting arm is provided with a hub 64 (see Fig. 4) having a square or polygonal bore therein engaging over the rock shaft and slidable lengthwise thereof. Such hub extends through the bearing boss 53 and forms a bearing sleeve or bushing for rotatably mounting the rock shaft in the boss 53. The hub 64 of the arm 63 is split or bifurcated at its forward end and provided with two fork members or lugs 65, and said hub is rigidly clamped on the rock shaft by means of a bolt or screw 66 passing through said lugs. By thus tightly clamping the hub 64 on the rock shaft movement of the arm 63 longitudinally on said rock shaft is prevented. When the mounting sleeves 49 are shifted along the frame bar 26, 26a to adjust the lateral spacing between the rig units the lifting arm 63 may be moved with said unit by simply loosening the bolt 66, said arm then being free to slide along the rock shaft with the sleeve 49.

The outer end of each lifting arm 63 is operatively connected with the lower link 59 of its associated rig mounting by means of a link or rod 67, the lower end of said link being bent laterally and passed through a flattened portion 68 of the link 59 in which it is held against removal by a cotter pin 69 as shown in Fig. 4. The upper end of the link 67 passes through the eye of an eyebolt 71 pivotally mounted in the outer end of the arm 63 and extending laterally at one side thereof, being held in position in said arm by means of a cotter pin 72 (see Fig. 3). The link 67 is screw-threaded at its upper end and provided with lock nuts 73 above the eye bolt 71 so that the length of said link may be adjusted by turning said nuts in one direction or the other on such threaded end.

Referring to Figs. 3 and 4, each cultivating rig 43 comprises one or more cultivator shovels or other soil working devices 74, a gauge wheel 75, and a supporting member 76 on which the shovel or shovels and gauge wheel are both supported. This supporting member 76 is in the form of a casting provided with a longitudinally extending boring in which the forward end of a longitudinally extending horizontally disposed tubular shovel supporting member or pipe 77 is inserted. The casting 76 is slotted and bolts 76a are provided for drawing the sides of the slot together to tighten the shovel supporting member rigidly therein, and a bolt 78 extending laterally through said casting and said member holds the member against turning in the casting. Said casting 76 is provided with a bifurcated bearing portion at its forward end between which the lower end of the link 59 is pivotally mounted by means of a pivot pin or bolt 79, and said link is also formed with a flattened portion 81 of considerable area, similar to the flattened portion 82 at the upper end thereof, which contacts with the flat surfaces of the bifurcated portion of the casting 76 whereby side play of the lower end of the link is substantially eliminated.

Formed integral with the casting 76 and extending upwardly therefrom as best shown in Fig. 4 is a bracket 82. In the upper end of this bracket is pivotally mounted a laterally extending eye bolt 83 held in position by means of a cotter pin 84. The lower threaded end of the upper link 58 of the parallel link mechanism extends through the eye of said bolt and has threaded thereon a pair of nuts 85, one on each side of said eye, for adjusting said link longitudinally relative to said eye. It will therefore be seen that the link 58 is pivotally connected at its lower end with the bracket 82 and that by providing this adjusting means the level of the rigs may be readily adjusted by either lengthening or shortening the length of said link between its pivot points by means of the nuts 85, as will be readily understood.

Rigidly secured to the intermediate portion of the bracket 82 by means of bolts 86 is a forwardly extending arm 87, the forward end of which supports a casting 88, said arm and casting being rigidly connected together by means of rivets or bolts 89. The casting 88 is provided with a vertically extending sleeve portion 91 at its forward end (see Figs. 5 and 6), in which is journaled a wheel spindle 92 which at its lower end carries the gauge wheel 75 above mentioned. The spindle 92 is provided with several transversely extending holes 93 spaced longitudinally therealong, and the sleeve 91 is provided in the center with transversely extending slots 94 at diametrically opposite points, which slots when alined with one of the holes 93 in the spindle 92 receive the ends of a cotter pin 95 inserted through such hole. By providing the several longitudinally spaced holes along the spindle 92, said spindle may be adjusted vertically in the sleeve 91 for adjusting the depth at which the shovels operate, as will be readily understood. The diametrically opposite transversely extending slots 94 which receive the ends of the cotter pin are of a sufficient length to permit the spindle to turn the required amount in the sleeve so that the gauge wheel 75 will have enough castering movement to prevent sidewise dragging of the wheel when the implement is shifted laterally or turned at the end of the field, which is very advantageous as it makes for more efficient operation of the implement.

The vertical shank of each of the shovels 74 of the front cultivating rigs is adjustably secured to its supporting member 77 by means of a casting 80 having a longitudinal boring by which it is clamped on the member 77 and a vertical boring for receiving said shank, and both said borings are slotted so that by tightening the clamping bolts 80a the casting may be securely clamped to the supporting member and shank, as will be readily understood.

Coming now to the cultivating implement detachably connected to the rear of the tractor as shown in Figs. 1 to 6, which construction has been devised where it is desirable to have two sets of cultivating shovels on the tractor owing to certain soil conditions, this rear attachment comprises a transversely extending frame bar 96, preferably tubular in cross-section as shown, supported at its ends adjacent the rear end of the tractor by means of two brackets 97, one of which is suitably secured to each drive chain housing 28 by means of bolts 98 (see Figs. 1 and 7). The brackets 97 extend rearwardly from the chain housings as shown, and are each provided with two spaced lugs 99 forming a semi-circular recess between them in which the ends of the frame bar 96 rest, the opposite ends of said bar being held in position in said recesses by means of bolts 101 passing through perforations in said lugs and through holes in said frame bar.

As shown in Fig. 2, the rear frame bar 96 carries three cultivator rigs, and as such rigs are supported from said bar in the same manner as the front rigs are supported from the front implement frame the rigs and the coresponding parts thereof are designated by the same reference numerals. However, the two outer rear rigs are bent laterally so as to position them directly in rear of the two traction wheels of the tractor. Also, these rigs of the rear implement frame differ from those of the front implement frame in that they are each provided with three shovels 74 instead of one or two shovels, which shovels cultivate in between the rows and also obliterate the tracks of the traction wheels, the latter function being performed primarily by the rearmost shovels of the two outer rigs. In these rear rigs also the shovels are mounted on their supporting members somewhat differently than those of the rigs of the front implement frame, and this mounting will now be described. Th two forward shovels of each of these rear implement rigs are carried on their supporting member 77 by means of a casting 102 and a transversely extending arm 103. The casting 102 is provided with a longitudinally extending boring for receiving the supporting member 77 and a transversely extending boring for receiving the arm 103. The arm 103 is provided with a ridge 104 along its upper side which is positioned in an upper slot in the transverse boring in the casting 102 to prevent rotative movement of the arm in said casting. The free or outer end of the arm 103 has a slotted vertical boring 105 therein for receiving the vertical shank of the shovel 74, said shank being held securely in said slotted boring by means of a bolt 105a, as shown in Fig. 2.

The rear shovel of each of the rear implement rigs is mounted on the supporting member 77 by means of a casting 106 which is provided with a longitudinal boring into which the supporting member 77 fits. This casting is also provided with a slotted vertically extending boring for receiving the vertical shank of the rear shovel 74.

A rear rock shaft 107 is supported by the rear transverse frame bar 96 in the same manner as the front rock shaft 54, 54a is supported from the front frame bar 26, 26a, and as such supporting means are similar they are indicated by the same reference characters. The means connecting the rear rock shaft with the rear implement rigs to raise said rigs upon the turning of said rock shaft by the power lift mechanism is also the same as the means connecting the front rock shaft with the front implement rigs so that it is not believed necessary to describe these parts in detail herein. They are indicated by the same reference numerals as those at the front end of the tractor.

The rigs of both the front and rear implement frames are lifted by means of the rock shafts 54 and 107, which rock shafts are operated by means of suitable linkage connections with the power lift mechanism 19, as will now be described. These connections comprise a link 108 pivotally connected to the crank 21 of the power lift mechanism and a link 109 pivotally connected with the rear end of the link 108. The link 109 is pivotally connected at its rear end with the lower end of an arm 111 fixed at its upper end on the rock shaft 107. The adjacent ends of the links 108 and 109 are pivotally connected with a link 112 depending from the rear axle housing 113. (See Fig. 7). Lifting force is transmitted to the front rock shaft 54 by means of a long link or rod 114 pivotally connected at its forward end to the lower end of an arm 115 fixed to said rock shaft 54 and extending downwardly therefrom as shown in Fig. 4. The rear end of the link or rod 114 is pivotally connected with the link 109 adjacent its rear end portion, as shown in Fig. 7.

In Figs. 1 and 7, the parts are illustrated in the positions they occupy when the rigs are in their lowered or operating position, and when the power lift mechanism is thrown into operation to raise said rigs the outer end of the crank 21 will swing downwardly and rearwardly, forcing the links 108 and 109 rearwardly. This rearward movement of said links exerts a rearward pull on the link 114, which, through its connection 115 with the front rock shaft 54, turns said rock shaft in a clockwise direction and raises the front rigs. At the same time, the depending arm 111 fixed to the rear rock shaft 107 is swung rearwardly, turning said rock shaft in a counterclockwise direction to raise the rear rigs. These two links 108, 109 pivotally connected together at such pivotal point are provided instead of a single link so that this mechanism will clear certain parts of the tractor adjacent thereto which would not be possible with a single link construction. Also, if a single link were provided in place of the two links there would be more danger of buckling under the compression strains to which such link would be subjected during the operation of the power lift mechanism.

It is pointed out in this connection that the lifting link or rod 114 for operating the front rock shaft 54 is extended back to connection with the link 109 adjacent the rear rock shaft with the result that this link is brought into a relatively high position, thus giving more clearance for the plant rows. By pivotally connecting the rear end of the link 114 with the link 109 adjacent the rear rock shaft and pivotally connecting the forward end of said link below the turning axis of the front rock shaft 54 said forward rock shaft is turned by said link acting under tension rather than under compression, which greatly improves the construction as all tendency of the link 114 to buckle is thus overcome. By this construction also the link 114 may be made much lighter in construction than would be the case if it acted under compression in the rig lifting operation.

In Figs. 8, 9 and 10 I have illustrated a modified form of construction in which the tractor is equipped with an implement frame extending transversely thereof adjacent its forward end. This transverse implement frame comprises a frame bar 116, similar to the frame bar 26, 26a, except that it is supported in an opening in the lower side of the tractor housing in rear of the front steering wheels, said frame bar extending outwardly laterally at each side of the tractor as shown. In this construction the cultivator rigs are positioned between the front steering wheels and the rear traction wheels of the tractor. The construction of the various rigs and their mounting on the frame bar 116 is the same as the front rigs in the preferred form of construction, and, therefore, it is not believed to be necessary to describe them in detail herein as similar parts are indicated by the same reference characters.

The raising and lowering of the rigs in this modified form of construction is controlled by two front rock shafts 117, 117a, one of said rock shafts being supported by the frame bar 116 on each side of the tractor as shown. The supporting means for said rock shafts is the same as that above described in connection with the rock shaft 54, 54a, and, therefore, they are indicated by the same reference characters. Extending transversely of the tractor and supported between the traction wheels thereof in the same manner as the rear frame bar 96 is a frame bar 118 carrying rear cultivator rigs supported therefrom in the same manner as the rear rigs shown in Figs. 1 and 2. A rear rock shaft 119 is rotatably supported in the upper ends of arms 121 extending upwardly from and formed integral with sleeves 112 secured on the shaft 118, one adjacent each end thereof as shown in Fig. 8. Said rock shaft is provided adjacent its outer ends with a pair of downwardly extending arms 123, to the lower ends of which are pivotally connected forwardly extending links 124, 125. The link 124 is pivotally connected at its forward end with a downwardly extending arm 126 rigidly connected with the rock shaft 117 at one side of the tractor, while the link 125 is pivotally connected with a downwardly extending arm 126a rigidly connected with the rock shaft 117a. The rear rock shaft 119 is operated from the power lift mechanism 127 through the crank 128, link 129, swinging plate 131 and link 132, the adjacent ends of the links 129 and 132 being pivotally connected with the plate 131 as shown in Fig. 10. The opposite end of the link 132 is pivotally connected with the upper end of an arm 133 rigidly secured to and extending upwardly from the rear rock shaft 119. In this modified form of construction the plate 131 is pivotally connected with the rear axle housing similarly to the pivotal mounting of the link 112 as shown in Fig. 7; also the links 129 and 132 and the plate 131 are provided in place of a single link for the same purpose that the links 108, 109 and 112 are provided in the preferred form of construction.

In the operation of this modified form of construction all the links of the power lift mechanism operate under tension in the raising of the rigs to transport position. As will be readily seen, the link 129, plate 131 and link 132 all act under tension, the crank 128 pulling forward on the link 129 which pull, acting through the plate 131 and link 132 turns the rear rock shaft 119 in a counter-clockwise direction. This turning of the rear rock shaft 119 exerts a rearward pull on the links 124, 125 through their connections 123 with said rock shaft, and such rearward pull on the links 124, 125 will turn the front rock shafts 117, 117a in a clockwise direction, thus raising the cultivator rigs. The rear cultivator rigs carried by the bar 118 are operatively connected with the rear rock shaft 119 in the same manner as the rear rigs illustrated in Figs. 1 and 2 are operatively connected with the rock shaft 107 and will therefore be operated by the turning of said rock shaft 119.

I claim:—

1. The combination with a tractor, of a tillage implement connected with said tractor and comprising an implement frame, a plurality of soil tilling rigs, substantially parallel link mechanism pivotally connecting each of said rigs with said implement frame to permit said rigs to rise and fall relatively to said frame with a substantially perpendicular movement, and castering gauge wheels associated with said rigs to determine the tilling depth thereof.

2. The combination with a tractor, of a tillage implement connected with said tractor and comprising an implement frame, a plurality of soil tilling rigs, substantially parallel link mechanism pivotally connecting each of said rigs with said implement frame to permit said rigs to rise and fall relatively to said frame with a substantially perpendicular movement, means for adjusting said parallel link mechanism to level said rigs, and a gauge wheel associated with each of said rigs to determine the tilling depth thereof.

3. The combination with a tractor, of a tillage implement connected with said tractor and comprising an implement frame, a plurality of soil tilling rigs, substantially parallel link mechanism pivotally connecting each of said rigs with said implement frame to permit said rigs to rise and fall relatively to said frame with a substantially perpendicular movement, means for adjusting said parallel link mechanism to level said rigs, and castering gauge wheels associated with said rigs to determine the tilling depth thereof.

4. The combination with a tractor, of a tillage implement connected with said tractor and comprising an implement frame, a plurality of soil tilling rigs, earth working tools carried by said rigs, castering gauge wheels connected with said rigs to determine the tilling depth thereof, mechanism pivotally connecting said rigs with said implement frame to permit said rigs and the gauge wheels to rise and fall relatively thereto while maintaining said earth working tools substantially in the same predetermined angular relation to the ground, and lifting means on said implement frame operatively connected to raise all of said rigs to transport position.

5. The combination with a tractor, of a tillage implement connected with said tractor and comprising an implement frame, a plurality of soil tilling rigs, castering gauge wheels connected with said rigs to determine the tilling depth thereof, pairs of substantially parallel links pivotally connecting each rig with said frame, said links permitting vertical movement of said rigs and the gauge wheels while maintaining the cultivating devices substantially in the same predetermined angular relation to the ground, means for adjusting one of the links of each pair of parallel links for leveling the rigs, and lifting means on said implement frame operatively connected with said rigs to raise the same to transport position.

6. The combination with a tractor, of a tillage implement connected with said tractor and comprising an implement frame, a plurality of soil tilling rigs, castering gauge wheels connected with said rigs to determine the tilling depth thereof, pairs of substantially parallel links pivotally connecting each rig with said frame, said links permitting vertical movement of said rigs and the gauge wheels while maintaining the cultivating devices substantially in the same predetermined angular relation to the ground, means for adjusting one of the links of each pair of parallel links for leveling the rigs, lifting means on said implement frame operatively connected with said rigs to raise the same to transport position, and power lift mechanism deriving its operating power from the tractor for actuating said lifting means.

7. The combination with a tractor, of a tillage implement disposed in front of the tractor comprising an implement frame, wheels supporting the front portion of said frame, means pivotally connecting the rear portion of said frame with the tractor to permit the implement frame to rise and fall relatively to the tractor, a plurality of soil tilling rigs, a gauge wheel associated with each of said rigs to determine the tilling depth thereof and mounted to turn about a vertical axis, and mechanism pivotally connecting said rigs and said gauge wheels with said implement frame to permit said rigs and said gauge wheels to rise and fall relatively thereto.

8. The combination with a tractor, of a tillage implement disposed in front of the tractor comprising an implement frame, caster wheels supporting the front portion of said frame, means pivotally connecting the rear portion of said frame with the tractor to permit the implement frame to rise and fall relatively to the tractor, a plurality of soil tilling rigs, a gauge wheel associated with each of said rigs to determine the tilling depth thereof and mounted to turn about a vertical axis, and parallel link mechanism pivotally connecting each of said rigs and its associated gauge wheel with said implement frame to permit said rigs and said gauge wheel to rise and fall relatively to said frame with a substantially perpendicular movement.

9. The combination with a tractor, of a cultivating implement disposed in front of the tractor comprising an implement frame, caster wheels supporting the front portion of said frame, means connecting the rear portion of said frame with the tractor to permit the implement frame to rise and fall relatively to the tractor, meanwhile holding the implement frame against lateral movement with respect to the tractor whereby said frame is guided by the steering of the tractor, a plurality of cultivating rigs, castering gauge wheels connected with said rigs to determine the cultivating depth thereof, mechanism pivotally connecting said rigs with said implement frame to permit said rigs and the gauge wheels to rise and fall relatively thereto, and lifting means on said implement frame operatively connected to raise all of said rigs to transport position.

10. The combination with a tractor, of a cultivating implement disposed in front of the tractor comprising an implement frame, caster wheels supporting the front portion of said frame, means pivotally connecting the rear portion of said frame with the tractor to permit the implement frame to rise and fall relatively to the tractor, a plurality of soil cultivating rigs, castering gauge wheels connected with said rigs to determine the cultivating depth of said rigs, pairs of substantially parallel links pivotally connecting each rig with said frame, said links permitting vertical movement of said rigs and gauge wheels while maintaining the cultivating devices substantially in the same predetermined angular relation to the ground, means for adjusting one of the links of each pair of parallel links for leveling the rigs, and lifting means mounted on said implement frame and operatively connected with said rigs to raise the same to transport position.

11. The combination with a tractor, of a cultivating implement disposed in front of the tractor comprising an implement frame, caster wheels supporting the front portion of said frame, means pivotally connecting the rear portion of said frame with the tractor to permit the implement frame to rise and fall relatively to the tractor, a plurality of soil cultivating rigs, castering gauge wheels connected with said rigs to determine the cultivating depth of said rigs, pairs of substantially parallel links pivotally connecting each rig with said frame, said links permitting vertical movement of said rigs and gauge wheels while maintaining the cultivating devices substantially in the same predetermined angular relation to the ground, means for adjusting one of the links of each pair of parallel links for leveling the rigs, lifting means mounted on said implement frame and operatively connected with said rigs to raise the same to transport position, and power lift mechanism deriving its operating power from the tractor for actuating said lifting means.

12. The combination with a tractor, of a tillage implement disposed in rear of the tractor comprising an implement frame, means connecting the front portion of said frame with the tractor between the rear wheels of the tractor and within the diameter of said wheels, a plurality of soil cultivating rigs associated with said implement frame, a gauge wheel connected with each of said rigs to determine the cultivating depth thereof, and mechanism pivotally connecting said rigs with said implement frame to permit said rigs and said gauge wheels to rise and fall relatively thereto.

13. The combination with a tractor, of a tillage implement disposed in rear of the tractor comprising an implement frame, means connecting the front portion of said frame with the tractor, said connecting means being positioned between the rear wheels of the tractor and within the diameter of said wheels, a plurality of soil cultivating rigs pivotally connected with said frame to rise and fall relatively thereto, and castering gauge wheels connected with said rigs to determine the tilling depth thereof.

14. The combination with a tractor, of a tillage implement disposed in rear of the tractor comprising a frame bar supported on the tractor within the tread and diameter of the rear wheels thereof, a plurality of soil cultivating rigs, a castering gauge wheel connected with each of said rigs to determine the tilling depth thereof, and substantially parallel link mechanism pivotally connecting each of said rigs with said frame bar to permit said rigs to rise and fall relatively to said frame with a substantially perpendicular movement.

15. The combination with a tractor, of a tillage implement disposed in rear of the tractor comprising a frame bar supported on the tractor within the tread and diameter of the rear wheels thereof, a plurality of soil cultivating rigs, a castering gauge wheel connected with each of said rigs to determine the tilling depth thereof, substantially parallel link mechanism pivotally connecting each of said rigs with said frame bar to permit said rigs to rise and fall relatively to said frame with a substantially perpendicular movement, and means for adjusting said parallel link mechanism to level said rigs.

16. The combination with a tractor, of a tillage implement disposed in front of the tractor comprising an implement frame, wheels supporting the front portion of said frame, means connecting the rear portion of said frame with the tractor below the axis of the rear wheels thereof to permit the implement frame to rise and fall relatively to the tractor, a tillage implement disposed in rear of the tractor comprising an implement frame, means connecting the front portion of said frame with the tractor, a plurality of soil tilling rigs pivotally connected with each of said implement frames to rise and fall relatively thereto, and castering gauge wheels associated with said rigs to determine the tilling depth thereof.

17. The combination with a tractor, of a tillage implement disposed in front of the tractor comprising an implement frame, wheels supporting the front portion of said frame, means connecting the rear portion of said frame with the tractor below the axis of the rear wheels thereof to permit the implement frame to rise and fall relatively to the tractor, a tillage implement disposed in rear of the tractor comprising an implement frame, means connecting the front portion of said frame with the tractor, said means being positioned between the rear wheels of the tractor and within the diameter of said wheels, a plurality of soil cultivating rigs associated with each of said implement frames, a castering gauge wheel connected with each of said rigs to determine the cultivating depth thereof, mechanism pivotally connecting said rigs with said implement frames to permit said rigs and the gauge wheels to rise and fall relatively thereto, and lifting means on said implement frame operatively connected to simultaneously raise all of the rigs of said frames to transport position.

18. In an agricultural implement, the combination with a tractor including a motor, of an attachment comprising a frame connected with the front portion of the tractor and extending laterally at opposite sides thereof, a plurality of cultivating rigs connected with said frame on opposite sides of the tractor to swing toward and from the ground, a rock shaft carried by said frame on each side of the tractor and connected with said rigs to raise and lower the same, a rock shaft supported at the rear of the tractor, a tension link on each side of the tractor connecting the front rock shafts with the rear rock shaft, and power lift mechanism deriving power from the tractor motor and operatively connected with said rear rock shaft.

19. In an agricultural implement, the combination with a tractor including a motor, of an attachment comprising a frame connected with the front portion of the tractor and extending laterally at opposite sides thereof, a plurality of cultivating rigs connected with said frame on opposite sides of the tractor to swing toward and from the ground, a rock shaft supported at the rear of the tractor, power lift mechanism deriving power from the tractor motor, linkage acting under tension in the power lift operation connecting said power lift mechanism with said rear rock shaft, and means connecting said rear rock shaft with said rigs for raising said rigs, said means comprising separate rock shafts carried by said attachment frame on either side of said tractor and a tension link connecting each of said last-named rock shafts with said rear rock shaft.

20. In an agricultural implement, the combination with a tractor including a motor, of a tillage implement disposed in front of the tractor comprising a frame, means connecting the rear portion of said frame with the tractor to permit the frame to rise and fall relatively to the tractor, a tillage implement disposed in rear of the tractor comprising a frame rigidly connected with the tractor, a plurality of soil tilling rigs pivotally mounted on each of said frames to rise and fall relatively thereto, a rock shaft mounted on each of said implement frames, means connecting each of said rock shafts with its associated rigs for raising said rigs upon the rocking of said rock shafts, power lift mechanism, and means connecting said power lift mechanism with said rear rock shaft for rocking the same to raise the rear rigs, and a link connecting said last-named means with said front rock shaft for rocking the same to raise the front rigs, said link acting under tension during the power lift operation.

21. In an agricultural implement, the combination with a tractor including a motor, of a frame connected with the front portion of the tractor and extending laterally on opposite sides thereof, a plurality of cultivating rigs connected with said frame on opposite sides of the tractor to swing toward and from the ground, a rock shaft carried by said frame on each side of the tractor and connected with said rigs to raise and lower the same, a rock shaft supported at the rear of the tractor, a link on each side of the tractor connecting the front rock shafts with the rear rock shaft, and power lift mechanism deriving power from the tractor motor and operatively connected with said rear rock shaft.

22. In an agricultural implement, the combination with a tractor including a motor, of a frame connected with the front portion of the tractor and extending laterally on opposite sides thereof, a plurality of cultivating rigs connected with said frame on opposite sides of the tractor to swing toward and from the ground, a rock shaft supported at the rear of the tractor, power lift mechanism deriving power from the tractor motor, linkage connecting said power lift mechanism with said rear rock shaft for rocking the same in the power lift operation, and means connecting said rear rock shaft with said rigs for raising said rigs, said means comprising separate rock shafts carried by said attachment frame on either side of said tractor and a link connecting each of said last named rock shafts with said rear rock shaft.

23. In an agricultural implement, the combination with a tractor including a motor, of a frame connected with the front portion of the tractor and extending laterally on opposite sides thereof, a plurality of cultivating rigs connected with said frame on opposite sides of the tractor to swing toward and from the ground, a rock shaft carried by said frame on each side of the tractor and connected with said rigs to raise and lower the same by the rocking thereof, a pair of cultivator rigs connected with the rear of the tractor to swing toward and from the ground, one of said rigs being mounted adjacent each rear wheel of the tractor, a rock shaft supported at the rear of the tractor, means connecting said last named rock shaft with said rear cultivator rigs for raising said rigs upon the rocking thereof, a link on each side of the tractor connecting the front rock shafts with the rear rock shaft, and power lift mechanism deriving power from the tractor motor and operatively connected with said rear rock shaft.

24. The combination with a tractor, of a tillage implement connected with said tractor and comprising an implement frame, a plurality of soil tilling rigs, means for pivotally connecting each of said rigs with said frame comprising two vertically spaced links disposed in a substantially longitudinal vertical plane to permit said rigs to rise and fall relatively to said frame, and castering gauge wheels associated with said rigs to determine the tilling depth thereof.

25. The combination with a tractor, of a tillage implement connected with said tractor and comprising an implement frame, a plurality of soil tilling rigs, means for pivotally connecting each of said rigs with said frame comprising two vertically spaced links disposed in a substantially longitudinal vertical plane to permit said rigs to rise and fall relatively to said frame, means for adjusting said link mechanism to level said rigs, and gauge means associated with each of said rigs and disposed in advance thereof to determine the tilling depth thereof.

26. The combination with a tractor, of a tillage implement connected with said tractor and comprising an implement frame, a plurality of soil tilling rigs, a pair of vertically spaced links disposed in a substantially longitudinal vertical plane pivotally connecting each of said rigs with said implement frame to permit said rigs to rise and fall relatively to said frame, means for adjusting said link mechanism to level said rigs, and castering gauge wheels associated with said rigs to determine the tilling depth thereof.

27. The combination with a tractor, of a tillage implement connected with said tractor and comprising an implement frame, a plurality of soil tilling rigs, a pair of links pivotally connecting each of said rigs with said implement frame to permit said rigs to rise and fall relatively to said frame, one of said links being screw-threaded at one end and extended through an eye carried by its associated rig and having a nut threaded thereon on each side of said eye whereby the length of said link may be adjusted to level said rigs, and a gauge wheel associated with each of said rigs to determine the tilling depth thereof.

28. The combination with a tractor, of a tillage implement connected with said tractor and comprising an implement frame, a plurality of soil tilling rigs, means for pivotally connecting each of said rigs with said frame comprising two vertically spaced links disposed in a substantially longitudinal vertical plane to permit said rigs to rise and fall relatively to said frame, the upper link being screw-threaded at one end and extended through an eye carried by its associated rig and having a nut threaded thereon on each side of said eye whereby the length of said link may be adjusted to level said rigs, and a gauge wheel associated with each of said rigs to determine the tilling depth thereof.

29. The combination with a tractor, of a tillage implement connected with said tractor and comprising an implement frame, a plurality of soil tilling rigs, link mechanism comprising a pair of vertically spaced links pivotally connecting each of said rigs with said implement frame to permit said rigs to rise and fall relatively to said frame, one of said links being screw-threaded at one end and extended through an eye carried by its associated rig and having a nut threaded thereon on each side of said eye whereby the effective length of said link may be adjusted to level said rigs, and a gauge wheel associated with each of said rigs and positioned to run on the undisturbed ground surface adjacent the forward end of the rig to determine the tilling depth thereof.

30. The combination with a tractor, of a tillage implement connected with said tractor and comprising an implement frame, a plurality of soil tilling rigs, a pair of vertically spaced links pivotally connecting each of said rigs with said implement frame to permit said rigs to rise and fall relatively to said frame, and a gauge wheel mounted to turn about a vertical axis associated with each of said rigs to determine the tilling depth thereof.

31. The combination with a tractor, of a tillage implement connected with said tractor and comprising an implement frame, a plurality of soil tilling rigs, earth working tools carried by said rigs, a gauge wheel mounted to turn about a vertical axis associated with each of said rigs to determine the tilling depth thereof, mechanism pivotally connecting said rigs with said implement frame to permit said rigs and gauge wheels to rise and fall relatively thereto, and lifting means on said implement frame operatively connected to raise all of said rigs to transport position.

32. The combination with a tractor, of a tillage implement disposed in front of the tractor comprising an implement frame, wheels supporting the front portion of said frame, means pivotally connecting the rear portion of said frame with the tractor to permit the implement frame to swing in an arc with respect to the tractor about a point below the axis of the rear wheels of the tractor, a plurality of soil tilling rigs, a gauge wheel associated with each of said rigs to determine the tilling depth thereof, and mechanism pivotally connecting said rigs and said gauge wheels with said implement frame to permit said rigs and said gauge wheels to rise and fall relatively thereto.

33. The combination with a tractor, of a tillage implement disposed in front of the tractor comprising a wheel supported frame and push bars connecting said implement with the tractor whereby the former is propelled by the latter in advance thereof and swings in an arc with respect to the tractor about a point below the axis of the rear wheels of the tractor, a plurality of soil tilling rigs, a gauge wheel associated with each of said rigs to determine the tilling depth thereof, and mechanism comprising vertically spaced links pivotally connecting said rigs and said gauge wheels with said implement frame to permit said rigs and said gauge wheels to rise and fall relatively thereto.

34. A farm implement comprising a power unit including a frame supported on propelling and steering wheels, a tillage unit arranged to be propelled thereby, including a frame having supporting means engaging the ground in advance of the power unit, and provided with tillage devices, longitudinally extending push bars pivotally connecting said units together to permit the tillage unit to move vertically in an arc with respect to the power unit about a point below the axis of the rear wheels of the power unit, and means connected between the frame of the power unit and at least one of said push bars to hold the tillage unit against lateral swinging with respect to the power unit, whereby the tillage unit is guided by the steering of the power unit.

35. A farm implement comprising a power unit including a frame supported on propelling and steering wheels, a tillage unit arranged to be propelled thereby, including a frame having supporting means engaging the ground in advance of the power unit, and provided with tillage devices, push bars connecting said frames whereby the tillage unit swings in an arc with respect to the power unit about a point below the axis of the rear wheels of the power unit, and means serving to hold the tillage unit against lateral swinging with respect to the power unit, whereby the tillage unit is guided by the steering of the power unit, said means comprising a transverse member connecting the frame of the power unit with said push bars.

36. A farm implement comprising a power unit including a frame supported on propelling and steering wheels, a tillage unit arranged to be propelled thereby, including a frame having supporting means engaging the ground in advance of the power unit and provided with tillage devices, a pair of longitudinally extending push bars pivotally connected at their rear ends to opposite sides of the power unit and having their forward ends fixedly connected with said tillage unit to permit said tillage unit to swing vertically relatively to said power unit about a point below the axis of the rear wheels of the power unit, and means to hold the tillage unit against lateral swinging with respect to the power unit comprising a link connected with the front end of the power unit frame and at least one of said push bars, whereby the tillage unit is guided by the steering of the power unit.

37. In an agricultural implement, the combination with a tractor, of a frame connected with the front portion of the tractor, a plurality of cultivator rigs connected with said frame, a rock shaft carried by said frame and connected with the rigs to raise and lower the same, a pair of cultivator rigs connected with the rear of the tractor, one rig being mounted adjacent each rear wheel of the tractor, a rock shaft supported at the rear of the tractor and connected with said rear rigs for raising and lowering the same, lifting means operatively connected with one of said rock shafts, and means interconnecting said rock shafts whereby rocking movement is transmitted from one rock shaft to the other.

In witness whereof, I hereunto subscribe my name this 22nd day of September, 1930.

THEODORE W. JOHNSON.